Dec. 21, 1926.

G. L. BIDDLE 1,611,507

TRACTOR ATTACHMENT

Filed June 25, 1925     3 Sheets-Sheet 1

Dec. 21, 1926.

G. L. BIDDLE 1,611,507

TRACTOR ATTACHMENT

Filed June 25, 1925

3 Sheets-Sheet 2

George L. Biddle.
Inventor

By
William L. Symons
his Attorney

Dec. 21, 1926.

G. L. BIDDLE 1,611,507

TRACTOR ATTACHMENT

Filed June 25, 1925

3 Sheets-Sheet 3

George L. Biddle
Inventor

By William L. Symons
His Attorney

Patented Dec. 21, 1926.

1,611,507

UNITED STATES PATENT OFFICE.

GEORGE L. BIDDLE, OF BUNNELL, FLORIDA.

TRACTOR ATTACHMENT.

Application filed June 25, 1925. Serial No. 39,576.

My invention relates to improvements in attachments for tractors and more especially to grubbing attachments or the like.

An important object of my invention is the provision of a device of the above mentioned character which is capable of use with standard makes of tractors.

Another object of my invention is to provide a device of this character with improved means for clearing ground of growths of scrub palmetto, bushes and the like.

A further object of my invention is the provision of a device of this character which will be simple in construction and strong and durable in use.

Other objects and advantages of my invention will be apparent during the course of the following description.

Figure 1:
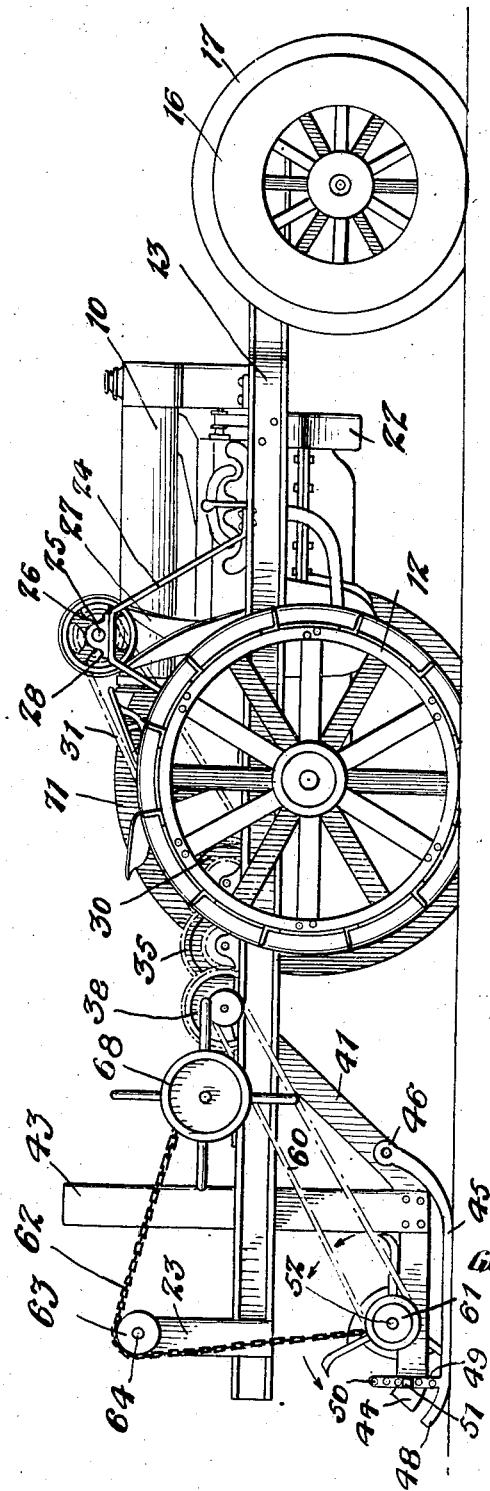
Figure 2:
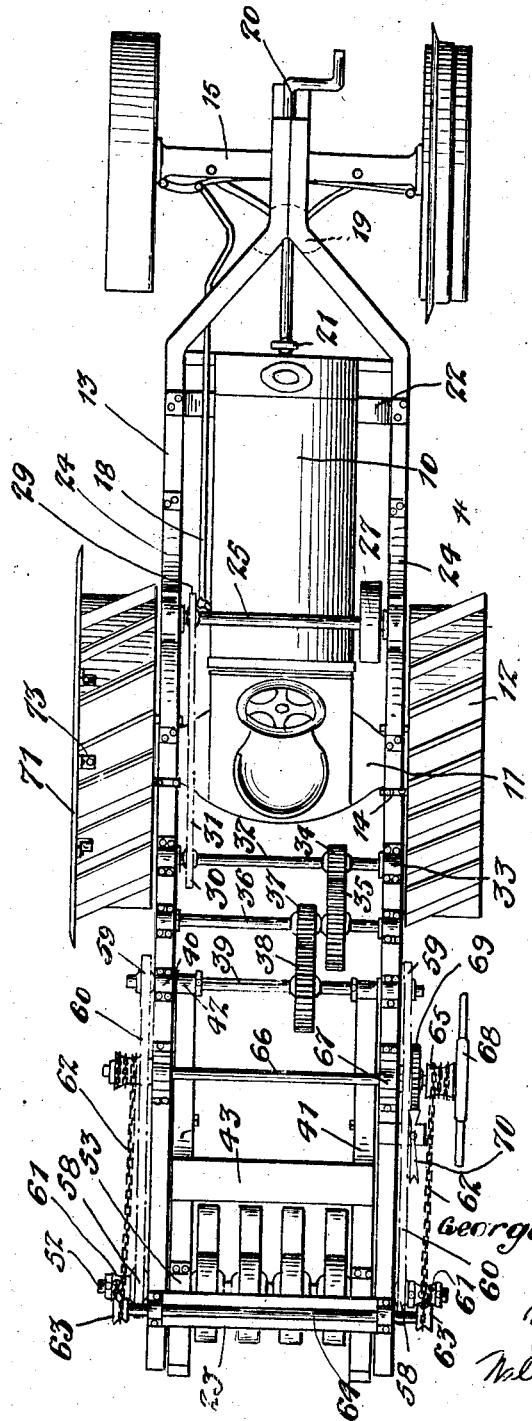
Figure 3:
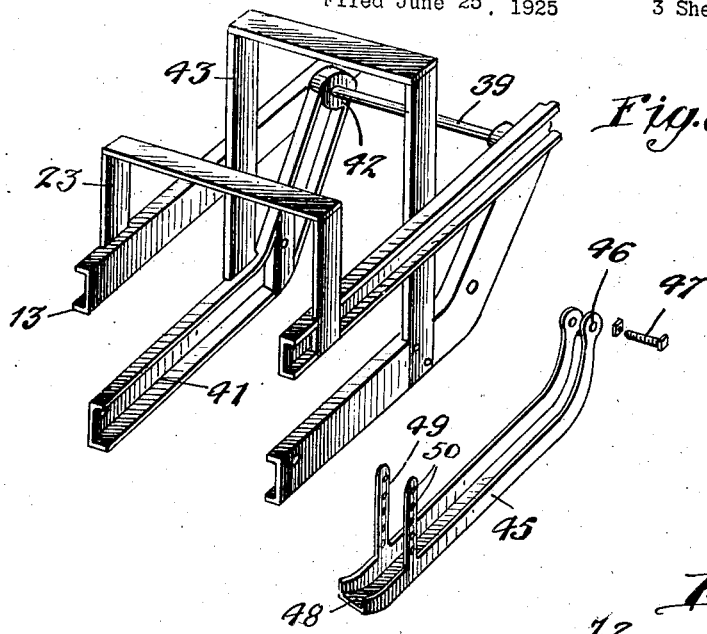
Figure 4:
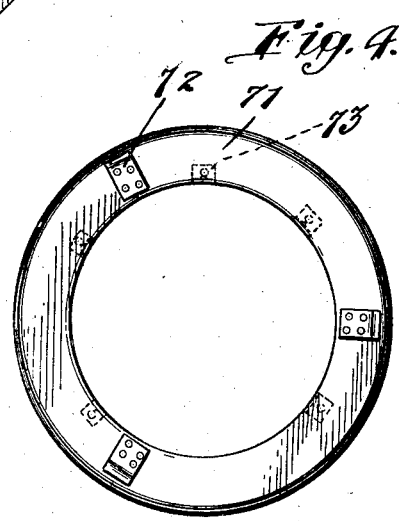
Figure 5:
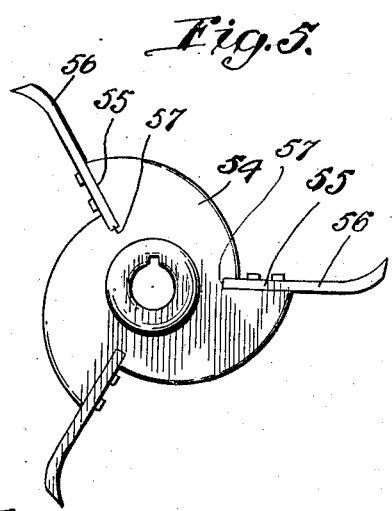
Figure 6:
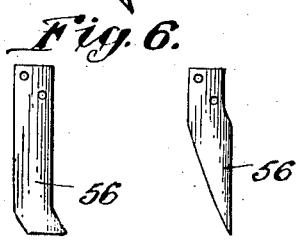

In the accompanying drawings which form a part of this specification and wherein like characters of reference denote like or corresponding parts throughout the same, Figure 1 is a side elevation of a tractor equipped with my improved attachment, Figure 2 is a plan view of the same, Figure 3 is a detail perspective of a portion of the framework, Figure 4 is an elevation of the wheel cutter, Figure 5 is an elevation of the grubbing members, and Figure 6 is an elevation of the grubbing blades.

In the drawings, wherein for the purpose of illustration is shown a preferred embodiment of my invention, the numeral 10 designates the body of a tractor having the usual rear axle 11 and rear wheels 12 provided with the usual cleats.

The frame is composed of two parallel longitudinal angle beams 13 secured to the rear axle at 14 and converging in front of the tractor body to be secured to the center portion of the front axle 15 which is arranged a substantial distance from the front of the tractor body to increase the wheel base thereof.

The front wheels are enlarged and weighted by means of cement 16. This may be done in any convenient manner, as for instance by placing a rear extension rim concentrically about the small front wheel, connecting the rims by means of bolts and filling in between the rims with cement. The right front wheel is preferably provided with a rim 17 to prevent skidding.

The steering arm 18 is extended to reach the steering knuckles and is bent to provide sufficient clearance for the enlarged wheel. The conventional radius rod bracket 19 is secured to the under side of the frame bars 13 and an extension crank 20 is connected to the crank shaft by means of a universal joint 21. The motor is held in place within the frame 13 by means of the arch support and brace 22.

The frame members 13 extend a substantial distance rearwardly of the rear axle and are connected adjacent their ends by the arch 23. A pair of brackets 24 are secured to the frame members and support a shaft 25 which is arranged above the motor of the tractor and is provided with a pulley 26 which connects with the usual power pulley on the tractor by means of a crossed belt 27. The ends of the shaft are journaled in bearings 28 and the end opposite the pulley 26 is provided with a small cog gear 29 which connects with a large cog gear 30 by the chain 31. The gear 30 is carried on one end of the shaft 32 which is journalled in bearings 33 on the frame members 13. The end of the shaft 32 remote from the cog 30 is provided with a small gear 34 which meshes with a larger gear 35 on the shaft 36 which is arranged parallel and adjacent the shaft 32. A small gear 37 on the shaft 36 meshes with a large gear 38 on a shaft 39 parallel to the shafts 32 and 36 and journalled in bearings 40 on the frame members 13.

The grubber frame comprises a pair of parallel spaced bars 41 arranged adjacent the ground but having their ends turned up and pivotally secured to the shaft 39 at 42. An arch 43 is secured to the bars 41 adjacent their turned up portions and may be braced in any convenient manner. The opposite or rearward ends of the bars 41 are slightly turned up at their ends as shown at 44. A pair of shoes 45 are U-shaped in cross section and have their ends turned up and provided with ears 46 which are pivotally secured to the turned up portions of the bars 41 by means of the bolt 47. The rearward ends of the shoes are also slightly turned up at 48 and adjacent their ends are provided with vertically extending straps 49 which have series of openings 50 for the reception of bolts 51 which secure the free ends of the shoes to the grubber frame. It will be seen that the relation of the shoes with respect to the grubber frame is adjustable by reason of the series of openings 50 allowing the shoes to be raised or lowered at will and clamped in place by the bolt 51 when the proper adjustment is found.

Arranged adjacent the end of the grubber frame is the transverse shaft 52 journaled in bearings 53. Arranged between the bars 41 and on the shaft 52 in spaced relation are grubber heads 54. These heads comprise a series of involute curves here shown as three. Where these curves meet, a stepped portion 55 is formed against which the grubber blades 56 are bolted, a notch 57 being preferably formed at the bottom of the stepped portion to receive the end of the blade. These blades are curved at their ends as shown in Figures 5 and 6 and when the head is rotated they will dig up the undergrowth, the head moving in a counter clockwise direction so that the stepped portions 55 will brace the blades. In Figure 6 are shown two forms of blades that may be used.

Gear wheels 58 are secured to the shaft 52 exteriorly of the frames and are connected to gear wheels 59 on the ends of the shaft 39 by means of chains 60 arranged on the outside of the frame. When the power is turned on, the grubber heads will be rotated in a direction opposite to that of the wheels of the tractor.

The ends of the grubber shaft 52 are provided with drums 61 to which chains 62, or the like, are secured. These chains pass up and over drums 63 on the ends of shaft 64 mounted on top of the arch 23 and from thence to drums 65 on the outside ends of shaft 66 journaled in bearings 67 rearwardly of the shaft 39, the chains being adapted to be wound upon said drums 65 by means of the hand wheel 68 to raise and lower the grubber frame. This movement is controlled by the ratchet wheel 69 on the shaft 66 and the pawl or latch 70 pivoted to a portion of the frame 13.

The left rear wheel is provided with a circular knife cutter 71 which is preferably formed in three sections and held together by plates 72. This knife is arranged on the outer edge of the wheel as shown in Figure 2, by means of the angle clamps 73.

In operation, the knife 71 cuts the roots and undergrowth and lets the grubbers dig them up. After the first trip, the right hand front wheel with the non-skid rim 17 will be on the cleared ground while the cutter 71 will be on the uncleared ground. The grubber frame may be moved into and out of operation by means of the hand wheel 68. The depth of the cut is determined by the shoes 45, upon which the grubber frame rides and which are capable of adjustment for different kinds of undergrowth, or the machine may be used for tilling, plowing, or the like by changing the type of blade used. The arches 23 and 43 provide clearance for the bushes, etc. and the arch 43 takes the side thrust off of the bearings 40.

While I have shown and described the preferred embodiment of my invention, it is to be understood that various changes in the size, shape, and arrangement of parts may be resorted to without departing from the spirit of my invention or the scope of the subjoined claims.

Having described my invention what I claim and desire to protect by Letters Patent is:

1. An attachment for tractors comprising a frame extending rearwardly from said tractor, a grubber frame secured thereto, an arch secured to said grubber frame and fitting within the tractor frame, grubbing members carried by said grubber frame, means to move the grubber frame into and out of its operative position and means to adjust the depth of the grubbing operation.

2. An attachment for tractors comprising a frame extending rearwardly of the tractor, a grubber frame secured thereto, means to move the grubber frame into and out of operation, means to prevent displacement of the grubbing frame laterally of the tractor frame, and shoes secured to said grubber frame and adapted to be adjusted relative thereto.

3. A grubbing attachment for tractors comprising a frame secured to the tractor and extending rearwardly therebeyond, a grubber frame pivotally secured thereto, grubbers mounted in said grubber frame, means connected to the power pulley on the tractor to rotate the grubbers, an arch secured to said grubber frame and fitting within the tractor frame, means to move the grubber frame into and out of operation, a shoe pivoted at one end to the grubber frame and an adjustable connection between the other end of said shoe and said grubber frame.

4. A grubbing attachment for tractors comprising a frame secured to the tractor body, said frame extending rearwardly of the tractor, a grubber frame secured to said frame, an arch mounted on said grubber frame and extending through the main frame, a shaft journaled on said grubber frame, grubbers arranged thereon, means connecting the power pulley of the tractor with said shaft to rotate the same, an arch secured to the main frame, a drum carried by said arch, means passing over said drum and connected with the grubber frame to move said grubber frame into and out of operation, a shoe pivotally secured at one end to the grubber frame and having an adjustable connection with said frame at its other end, and a knife carried by one of the rear wheels of the tractor in advance of the grubbers and adapted to cooperate therewith.

In testimony whereof I affix my signature.

GEORGE L. BIDDLE.